United States Patent [19]

Turner et al.

[11] Patent Number: 4,550,397
[45] Date of Patent: Oct. 29, 1985

[54] ALTERNATE PATHS IN A SELF-ROUTING PACKET SWITCHING NETWORK

[75] Inventors: Jonathan S. Turner, University City, Mo.; Leonard F. Wyatt, Naperville, Ill.

[73] Assignee: AT&T Bell Laboratories, Murray Hill, N.J.

[21] Appl. No.: 562,176

[22] Filed: Dec. 16, 1983

[51] Int. Cl.⁴ .................. H04Q 11/04; H04J 3/00; H04J 6/00
[52] U.S. Cl. .................................. 370/60; 370/94
[58] Field of Search .................. 370/58, 60, 54, 16

[56] References Cited

U.S. PATENT DOCUMENTS

| | | | |
|---|---|---|---|
| 4,201,891 | 5/1980 | Lawrence et al. | 370/58 |
| 4,276,637 | 6/1981 | Le Dieu | 370/16 |
| 4,314,367 | 2/1982 | Bakka et al. | 370/60 |
| 4,320,500 | 3/1982 | Barberis et al. | 370/60 |
| 4,455,645 | 6/1984 | Mijioka et al. | 370/16 |
| 4,484,326 | 11/1984 | Turner | 370/60 |

FOREIGN PATENT DOCUMENTS

84/01868  5/1984  European Pat. Off. .
58-150349  9/1983  Japan .

OTHER PUBLICATIONS

*IEEE Transactions on Computers*, vol. C-31, No. 5, May, 1982, New York (US) G. B. Adams, III, et al., "The Extra Stage Cube: A Fault-Tolerant Interconnection Network for Supersystems", pp. 443-454.
*IEEE Transactions on Computers*, vol. C-27, No. 10, Oct., 1979, New York (US) A. Hopper, et al., "Binary Routing Networks", pp. 669-703.
P. C. Richards, "Technological Evolution-The Making of a Survivable Switching System", *3rd World Telecommunication Forum*, 1979, pp. 1.2.6.1-1.2.6.8.
1979 August, Bolt Beranek and Newman Inc., Report No. 4098, "Development of a Voice Funnel System", pp. III-34 through III-39.

*Primary Examiner*—Douglas W. Olms
*Assistant Examiner*—Wellington Chin
*Attorney, Agent, or Firm*—John C. Moran

[57] ABSTRACT

A packet switching architecture in which switching network nodes automatically determine alternate routes through a switching network so as to increase reliability and distribute traffic. The switching network comprises stages of distribution and routing nodes. The routing nodes are responsive to physical addresses associated with the packets to communicate those packets to address designated downstream nodes. The distribution switching nodes statistically communicate packets to downstream switching nodes on the basis of an alternate routing algorithm and availability of downstream nodes. The initial network stages are alternate distribution and routing stages followed by only routing stages for the remaining stages of the network. Both the routing and the distributing nodes are identical in design and are responsive to an input signal from the network to assume either routing or distributing functions.

16 Claims, 14 Drawing Figures

FIG. 4, FIG. 5, FIG. 6, FIG. 7: Packet format diagrams showing fields: START BIT, PACKET LENGTH, DEST TRUNK CNTRLR, SOURCE TRUNK CNTRLR, CONTROL, ARRIVAL TIME, PACKET IDENTIFIER, LOGICAL ADDRESS, TIME STAMP, DATA, CRC.

- FIG. 4: PACKET LENGTH=0001, DEST=15, CONTROL=0, PACKET IDENTIFIER=0, TIME STAMP=2
- FIG. 5: PACKET LENGTH=0001, DEST=15, CONTROL=0, PACKET IDENTIFIER=1, TIME STAMP=2
- FIG. 6: PACKET LENGTH=0010, DEST=15, CONTROL=0, PACKET IDENTIFIER=1, TIME STAMP=2
- FIG. 7: PACKET LENGTH=0010, DEST=15, CONTROL=0, PACKET IDENTIFIER=1, TIME STAMP=2

FIG. 8

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 0100 | 15 | 0 | | 0 | | 2 | | |

FIG. 9

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 0100 | 15 | 0 | | 1 | | 2 | | |

FIG. 10

| START BIT | PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|---|
| | | 1000 | 15 | 0 | | 1 | | 2 | | |

ALTERNATE PATHS IN A SELF-ROUTING PACKET SWITCHING NETWORK

CROSS-REFERENCE TO RELATED APPLICATIONS

The following applications were filed on June 25, 1982, and assigned to the same assignee as this application: J. S. Turner, "Fast Packet Switch", now U.S. Pat. No. 4,491,945; J. S. Turner, "An Interface Facility for a Packet Switching System", now U.S. Pat. No. 4,488,289; J. S. Turner, "End-To-End Information Memory Arrangement in a Line Controller", now U.S. Pat. No. 4,488,288; J. S. Turner, "Packet Switching Loop-Around Network and Facilities Testing", now U.S. Pat. No. 4,486,877; J. S. Turner, "A Fast Packet Switching Network", now U.S. Pat. No. 4,494,230; and W. A. Montgomery, "Time Stamping for a Packet Switching System", now U.S. Pat. No. 4,506,358.

J. S. Turner, "Duplicated Network Arrays and Control Facilities for Packet Switching", Ser. No. 438,572, was filed on Nov. 1, 1982; J. S. Turner, "Packet Load Monitoring by Trunk Controllers", now U.S. Pat. No. 4,484,326, was filed on Nov. 4, 1982; J. S. Turner, "Packet Error Rate Measurements By Distributed Measurements", now U.S. Pat. No. 4,490,817, was filed on Dec. 13, 1982; J. S. Turner, "Integrated Self-Checking Packet Switch Node", Ser. No. 495,716, was filed on May 18, 1983; and J. S. Turner, "Distributed Monitoring of Packet Transmission Delay" Ser. No. 521,884, was filed on Aug. 10, 1983. All five applications are assigned to the same assignee as this application.

TECHNICAL FIELD

This invention relates to a method and packet switching architecture for the packet switching of information signals. The invention specifically pertains to a packet switching architecture having an integratable network of fast packet switches arranged into routing and distribution stages for routing packets based on address information within the packets and for determining alternate paths through the network, respectively.

BACKGROUND OF THE INVENTION

Packet switching networks such as those using self-routing switching nodes communicate packets on the basis of address information contained within the packets. In such self-routing networks, there is generally only one unique route between each input and output pair of the network. This characteristic makes fault diagnosis easy since a faulty switching node within the network can be located by the intersection of two paths which share only that node. A problem with the existence of only one unique route is that it reduces reliability and the ability to operate under unbalanced traffic conditions. Reliability is a problem since the failure of a single node or link between nodes causes many routes to be unavailable. The traffic problem arises because a particular traffic pattern may cause a number of routes communicating a large amount of traffic to be channeled through one node. When this occurs, the traffic capacity on these paths is limited to that of a single node.

One method for overcoming the potential reliability and traffic problems of a self-routing packet switching network is disclosed in the above-identified application of J. S. Turner, Ser. No. 438,572. That application describes a fast packet system in which packet switching networks are interconnected by trunks with each trunk terminated on both ends by a trunk controller. Each of the switching networks comprises duplicated switching arrays. During nonfailure conditions, the duplicated network arrays are both normally operational, and any given trunk controller cooperates with the duplicate network arrays to distribute the workload of packet switching by rotating or alternating the routing of packets between each of the arrays and the trunk attached to that trunk controller. In the event that one switching array fails, the failure is automatically detected by the trunk controller which then routes packets only to the nonfailing switching array. This technique is more expensive than a single unduplicated array due to the additional cost of duplicating the switching array. In addition, an unbalance of traffic load is only reduced by half since there are only two paths (one path through each switching array) available for routing packets.

One known method for alleviating the reliability and traffic problems in a self-routing network is discussed in the report entitled, "Development of a Voice Funnel System", Bolt, Beranek and Newman, Inc., Report No. 4098, August, 1979, pp.III-29 through 76, which discloses the use of an extra stage of banyan switching nodes at the input of a self-routing network to resolve the previously mentioned problems. The report proposes that this extra stage of switching be identical to other stages of the network and be utilized by adding an extra bit of addressing to the address field of each packet being routed through the switching network. The extra address bit would be controlled by hardware or software external to the switching network and would determine the route through the switching network. The hardware or software would use this bit so as to avoid a node which was failing or experiencing heavy traffic. Whereas the method proposed by the report allows the addition of more than one unique route through the switching network, it requires that the decision of which route to use be made external to the packet switching network.

SUMMARY OF THE INVENTION

The foregoing problems are solved in accordance with the principles of this invention as disclosed in a structural embodiment in which a packet switching network comprising stages of distribution and routing switching nodes allows compensation for unbalanced traffic conditions and failures of switching nodes. Switching nodes in the distribution stages route packets to downstream switching nodes on the basis of an alternate routing algorithm to distribute the traffic statistically throughout the network and to automatically compensate for failing downstream switching nodes. The architecture of the network is such that the initial network stages comprise alternate distribution and routing stages followed by only routing stages for the remaining stages of the network. The advantage of alternate distribution and routing stages is that the problems associated with unbalanced traffic conditions are compensated for to a greater degree rather than just positioning all of the distribution stages in the initial stages of the network. The reason is that the initial routing stages began to focus the packets towards their final destination so that subsequent distribution nodes can more effectively circumvent any overloaded downstream routing nodes.

Each of the switching nodes in a distribution stage is responsive to the receipt of a packet for alternately communicating that packet to one of a subset of downstream switching nodes on the basis of an alternate switching algorithm and the availability of the selected one of the downstream switching nodes. Each of the switching nodes in a routing stage is responsive to the address information contained in each packet for communicating that packet to a downstream switching node. Each of the distribution switching nodes comprises means for storing signals and updating these signals so as to designate the next one of the subset of downstream switching nodes to which the next packet will be communicated. If the designated downstream packet is unavailable, then a distribution node automatically routes the packet to another available downstream switching node within the subset.

Advantageously, both the routing and distribution switching nodes are identical in circuit design and respond to an external signal to perform the functions of either a routing or distribution node. In response to this external signal, a switching node in a routing stage also rotates the address information so as to position the address information for immediate use by the downstream node.

BRIEF DESCRIPTION OF THE DRAWING

In general, system elements, when first introduced on a figure, are each designated with a number that uses the figure number as the most significant digits of the element number.

FIGS. 3 through 10 illustrate packet transformations performed during the communication of a packet from the input of trunk controller 104 to the input of trunk controller 109;

DETAILED DESCRIPTION

Figure 1:
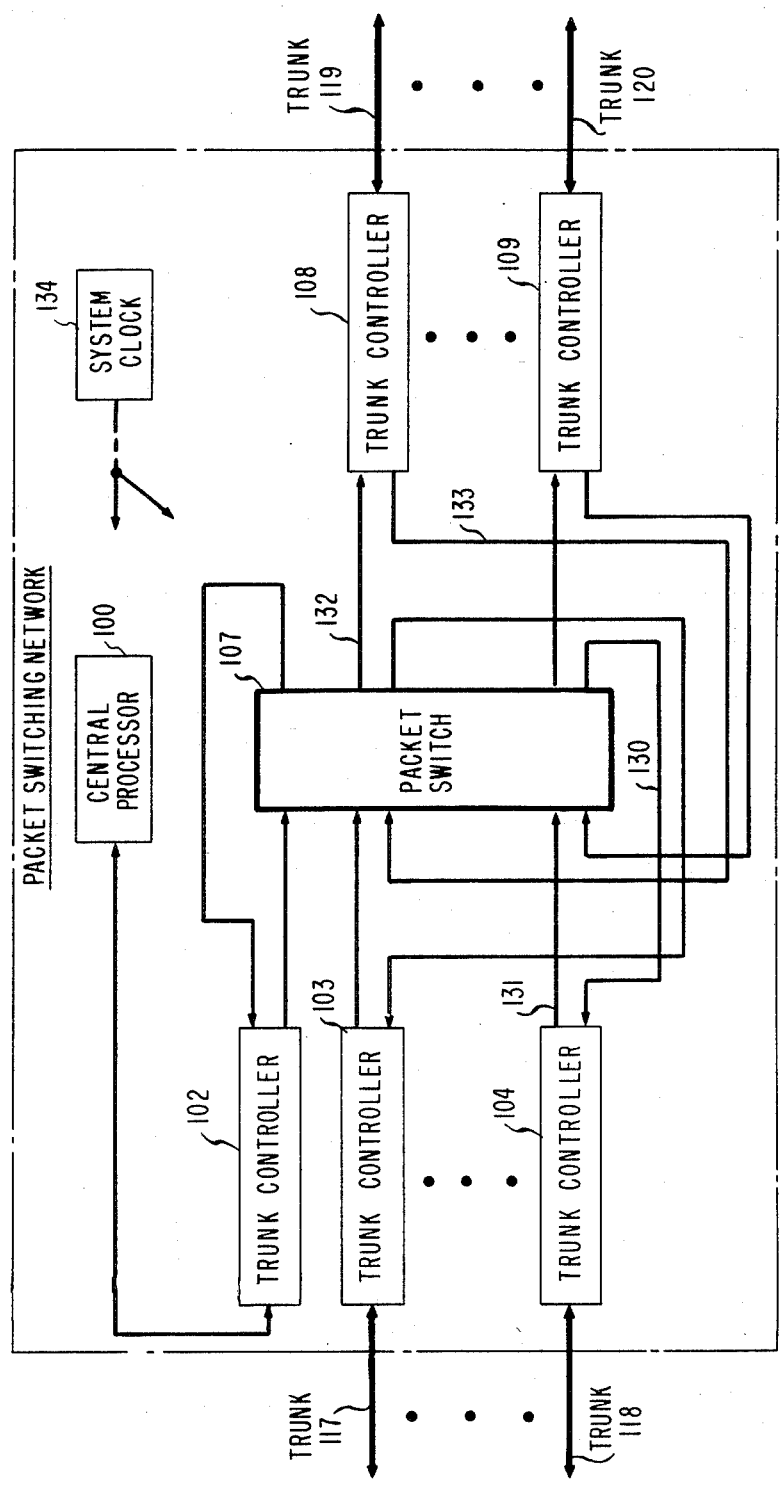
FIG. 1 illustrates, in block diagram form, a packet switching network which would utilize the present invention.

FIG. 1 shows an illustrative packet switching network serving a plurality of high-speed trunks such as trunks 117 and 119. First, a general description of the subsystems constituting the packet switching network of FIG. 1 is given and then, a description is given of packet switch 107 and its components which is the focus of this invention. As shown in FIG. 1, packet switch 107 terminates a plurality of trunk controllers and cooperates with central processor 100 via central processor trunk controller 102. Each trunk packet transmitted on a trunk contains a logical address which specifies the route that the packet is to take through the packet switching network. Each trunk controller comprises a memory containing a translation table for converting the logical addresses into switch addresses which are used by switch 107 to route the packets to a destination trunk controller. The translation information is stored in the memory of each trunk controller by central processor 100 via trunk controller 102 and switch 107 in response to call setup and call reply packets. To illustrate the overall function of switch 107, consider the routing of the packet illustrated in FIG. 3 from trunk 118 to trunk 119 via trunk controllers 104 and 108 and switch 107. Upon receipt of the packet illustrated in FIG. 3, trunk controller 104 assembles the trunk packet into a switch packet as illustrated in FIG. 4. The switch packet comprises all the information of the trunk packet of FIG. 3 with the exception of the flag fields and the information necessary to route the packet through switch 107 to trunk controller 108. Switch 107 is responsive to the destination trunk controller field to perform this routing. In response to the receipt of the switch packet from switch 107, trunk controller 108 removes the original trunk packet received by trunk controller 104, adds the necessary flag fields, and transmits this trunk packet on trunk 119.

Figure 2:
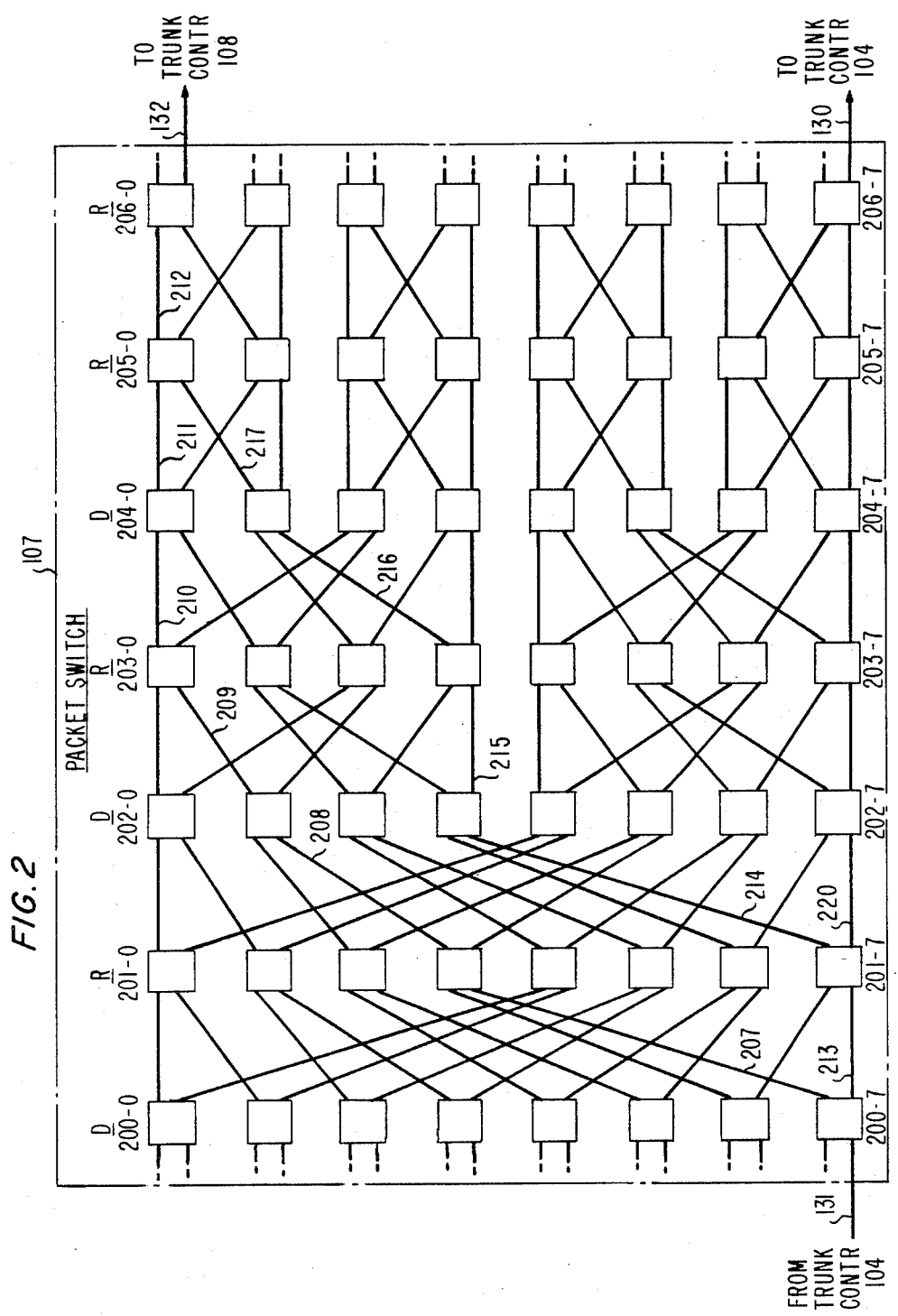
FIG. 2 illustrates, in block diagram form, packet switch 107 of FIG. 1 which is the subject matter of this invention.

Packet switch 107 is shown in greater detail in FIG. 2. Switch 107 comprises a plurality of switch node stages. Each stage consists either of distribution nodes or routing nodes and are referred to as distribution or routing stages, respectively. For example, distribution nodes 200-0 through 200-7 constitute distribution stage 200. A routing node is responsive to the most significant address of the destination trunk controller field to select the proper output link and to rotate the address contained in the destination trunk controller field one bit to the right in preparation for the next routing node. A distribution node is responsive to a switch packet to automatically attempt to retransmit the switch packet on an output determined by an internal flip-flop. However, if the predetermined output link is busy, the distribution node transmits the switch packet on the other output link to which it is attached. The internal flip-flop is toggled after the transmission of each packet. The result is that, a distribution node attempts to alternate between output links in the transmission of switch packets.

Since each distribution node transmits the received switch packet out on either of two output links, there are a variety of paths through switch 107 which a packet may take during its transmission via the packet switch from one trunk controller to a destination trunk controller. Two examples are now given to illustrate the different routes which are available between any two trunk controllers through switch 107. The examples assume packet transmission between trunk controller 104 and 108 and further assume that the distribution flip-flops in each of the distribution stages for these two routes have the predefined values and the links are available such that the first route will be over links 207, 208, 209, 210, 211, and 212. The second route due to the state of the distribution flip-flops will be 213, 214, 215, 216, 217 and 212.

Figure 3:
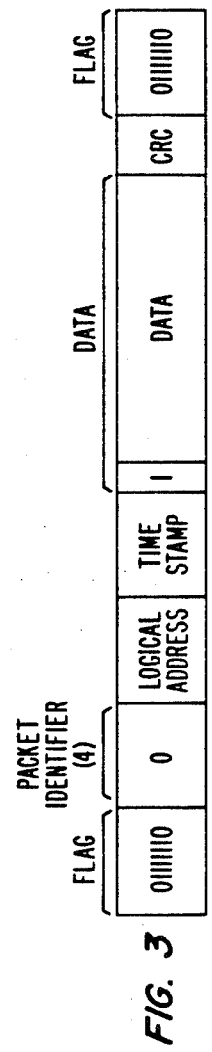

When trunk controller 104 receives a trunk packet as illustrated in FIG. 3, it converts this trunk packet to a switch packet as illustrated in FIG. 4 by performing the necessary address translations and assembly operations. The transformation of a trunk packet to a switch packet by trunk controller is discussed in detail in the beforementioned J. S. Turner Case 5, and is not repeated here. After formation of the switch packet illustrated in FIG. 4, trunk controller 104 transmits this switch packet to node 200-7 via conductor 131. Since node 200-7 is a distribution node, it routes the switch packet to either of the two links connected to its outputs. Illustratively, assume that node 200-7 routes the switch packet via link 207 to node 201-3. The configuration of the switch packet routed via link 207 is illustrated in FIG. 5 and is identical to the switch packet of FIG. 4. Node 201-3 routes the packet to node 202-1 via link 208 in response to the most significant bit of the destination trunk controller field being a "0" as illustrated in FIG. 5. Node 201-3 is further responsive to the switch packet to rotate the destination trunk controller field to the left by one bit. The effect of this rotation of the destination trunk controller field is illustrated in FIG. 6 which is the packet transmitted to node 202-1.

Node 202-1 is a distribution node and illustratively for this example routes the switch packet received via link 208 to node 203-0 via link 209 assuming that the internal flip-flop of node 204-0 designates link 209. The packet routed via link 209 is illustrated in FIG. 7. Since node 203-0 is a routing node, it is responsive to the most significant bit of the destination trunk controller field to route the switch packet to node 204-0 via link 210. The switch packet routed via link 210 is illustrated in FIG. 8. As illustrated in FIG. 8, node 203-0 performed a left rotation on the destination trunk controller field. Illustratively, node 204-0 transmits the switch packet received via link 210 to node 205-0 via link 211 assuming that the internal flip-flop of node 204-0 designates link 211. The packet transmitted to node 205-0 is illustrated in FIG. 9. Node 205-0 being a routing node is responsive to the switch packet having the most significant bit of the destination control field being a "0" to route this packet to node 206-0 via link 212 after left rotating the destination trunk controller field as illustrated in FIG. 10. Node 206-0, also a routing node, is responsive to the most significant bit of the destination trunk controller field being a "1" to route this packet to trunk controller 108 via conductor 132.

The second path which is described from trunk controller 104 to trunk controller 108 which assumes that the distribution nodes alternately route the packet between the two links due to a predefined state of their internal distribution flip-flops is now described. In response to the switch packet illustrated in FIG. 4, node 200-7 routes this packet to node 201-7 via link 213. The packet routed is identical to that shown in FIG. 5. Node 201-7 is responsive to the most significant bit of the destination trunk controller field being a "0" to route this packet to node 202-3 via link 214. The packet routed via link 214 is illustrated in FIG. 6. Assuming that node 202-3 is responsive to the packet to route it to node 203-3 via link 215, node 203-0 is responsive to the packet to route it to node 204-1 via link 216 since the most significant bit of the destination trunk controller field is a "0". Illustratively, node 204-1 is responsive to the packet to route it to node 205-0 via link 217. Node 205-0 is responsive to the most significant bit of the destination trunk controller field being a "0" to route the packet via link 212 to node 206-0. The packet routed to node 206-0 is illustrated in FIG. 10. As in the previous route, node 206-0 is responsive to the packet to transmit it to trunk controller 108 via conductor 132.

Figure 11:
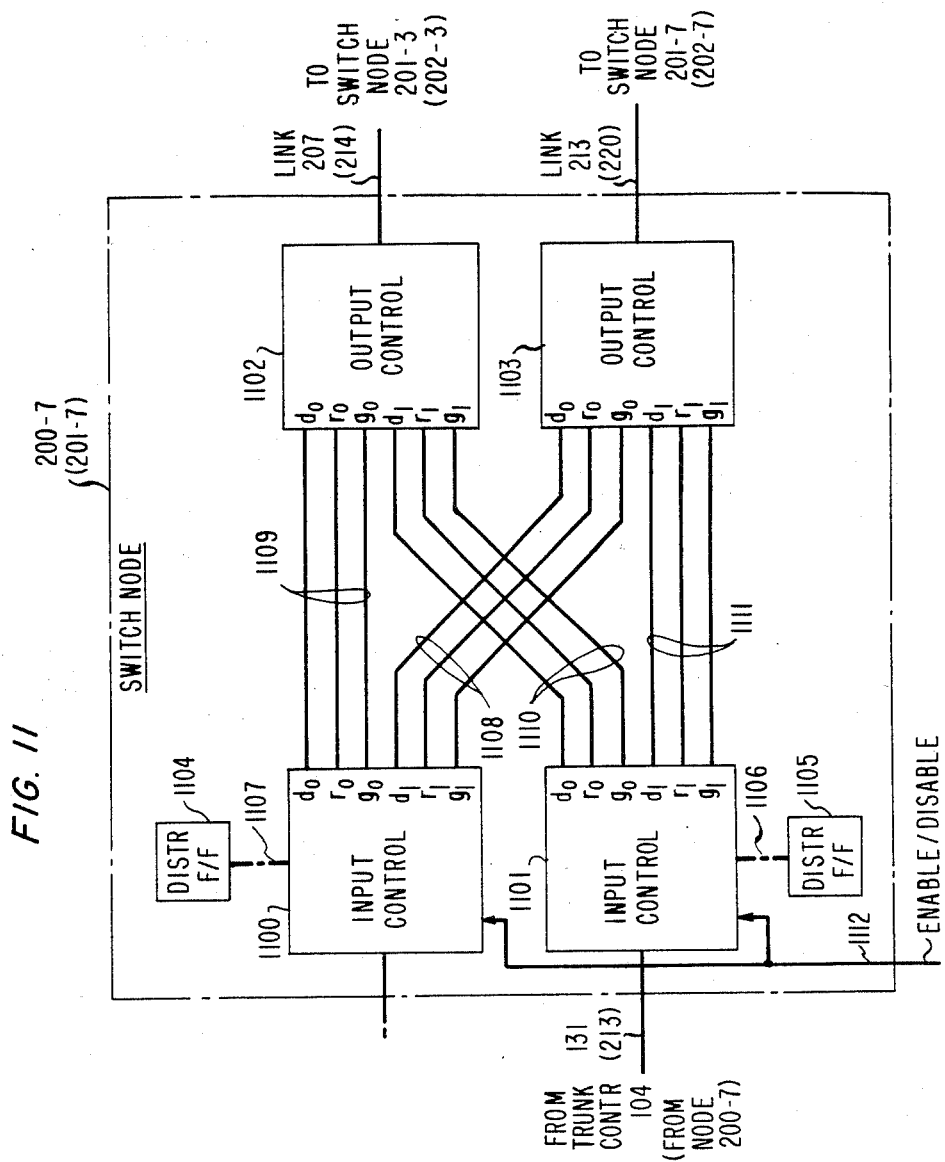
FIG. 11 is a detailed block diagram of switch node 200-7 of packet switch 107.

Switch node 200-7 is illustrated in greater detail in FIG. 11. Node 200-7 comprises input control units, 1100 and 1101, and output control units 1102 and 1103. A distribution node such as 200-7 is identical in design to a routing node such as 201-7 and the numbers in parenthesis indicate connections to links for the case when FIG. 11 illustrates node 201-7. The difference between the two types of nodes is whether or not the node is receiving the disable signal illustratively in the case of node 200-7 via conductor 1112. If a node is receiving the disable signal, it performs the routing function whereas if the node is not receiving the disable signal, it performs the distribution function. Since node 200-7 is a distribution node, the disable signal is not being transmitted via conductor 1112. In response to a packet being received on conductor 131, input control 1101 attempts to route this packet via cable 1110 to output control 1102 if the state of the distribution flip-flop 1105 is a "0", or input control 1101 attempts to route this packet to output control 1103 via cable 1111 if the state of the distribution flip-flop 1105 is a "1". If the output control designated by distribution flip-flop 1105 is busy, then the input control 1101 attempts to route the packet to the other output control. In order to determine whether an output control is busy, input control 1101 uses the transmission of request and grant signals via cables 1110 and 1111. For example, to determine whether output control 1102 is busy, input control 1101 transmits a request signal to output control 1102 via cable 1110. If output control 1102 is idle, it transmits the grant signal back to input control 1101. Upon receipt of the grant signal, input control 1101 commences transmission of the packet to output control 1102 via cable 1110. Input control 1100 is identical in design and operation to input control 1101.

Output control 1102 monitors link 207 and as is described later, internally stores whether the link 207 is busy or idle. Upon receipt of data from either input control 1101 or 1100, output control 1102 retransmits this information via link 207 to node 201-3. Output control 1103 is similar in design and function to output control 1102.

As previously stated, a routing node is identical in design to a distribution node such as node 200-7. The function performed by a routing node is different than a distribution node since a routing node is responsive to the most significant bit of the trunk destination control field to determine which output control the packet is to be routed to. For example, if node 200-7 was receiving the disable signal via conductor 1112, it would perform the following routing node functions. Input control 1101 would be responsive to a packet received on link 213 to route this packet to output control 1102 if the most significant bit of the trunk destination control field was a "0" or to route this packet to output control 1103 if the most significant bit of the trunk destination control field was a "1". During the transfer of the packet from input control 1101 to the designated output control, input control 1101 left shifts the most significant bit of the trunk destination control field to the least significant bit position. This left shift operation assures that the trunk destination control field is in the proper state so that the next routing node can base its routing decision on the most significant bit of the trunk destination control field.

When a node is performing the routing functions, the distribution flip-flops are not used. If the output control which is designated by the most significant bit of the trunk destination control field is busy, then the input control buffers the packet and waits until the designated output control is idle.

Figure 12:
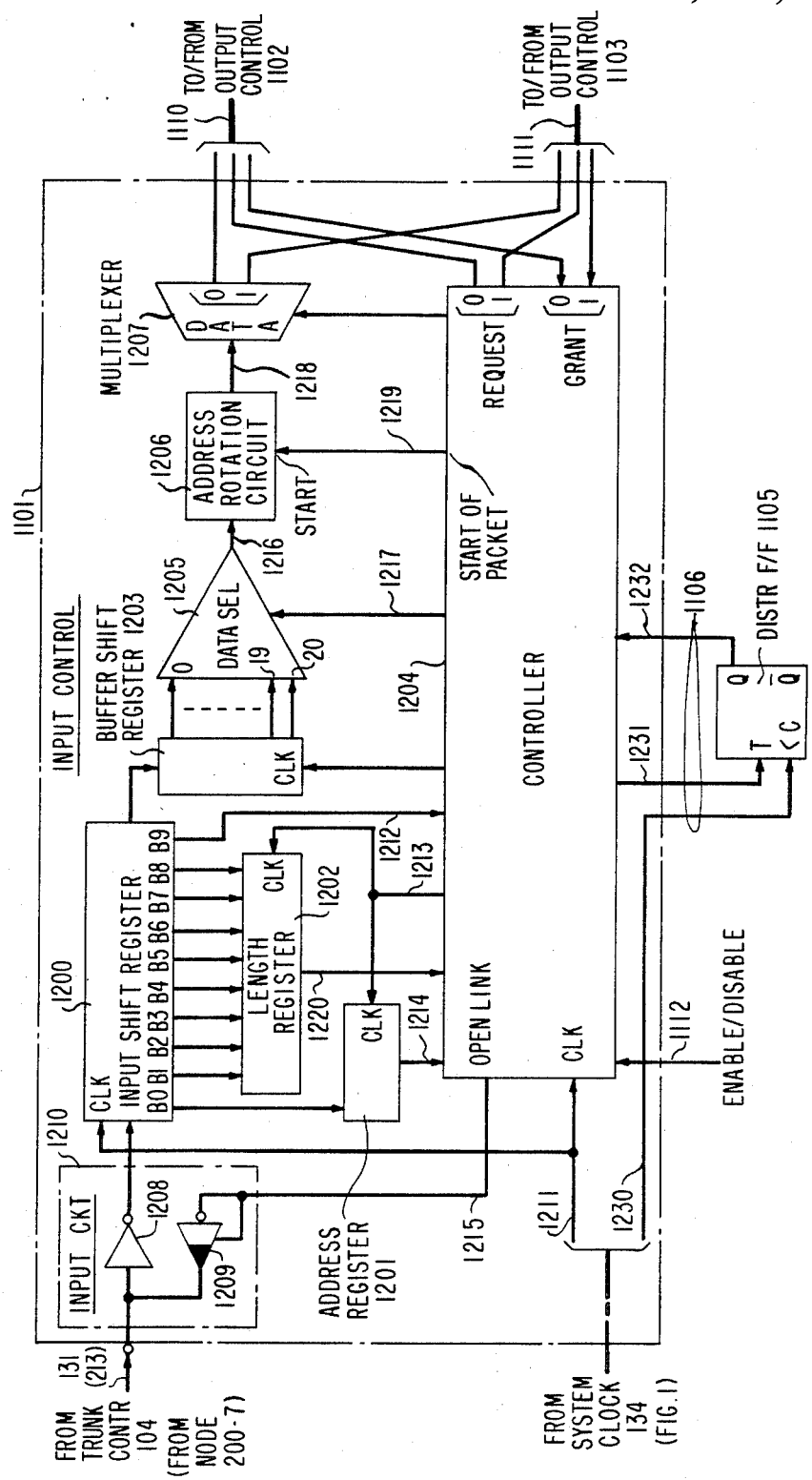
FIG. 12 is a detailed block diagram of input control 1101 of switch node 200-7.

Input control 1101 is shown in greater detail in FIG. 12. Input control 1101 can be conditioned to cause its associated switch node to function as either a distribution node or as a routing node. Input control 1101 is configured to perform either the distribution or routing function via an enable signal which can be optionally strapped from the backplane via conductor 1112. When operating in the distribution mode, address register 1201 and address rotation circuit 1206 are disabled via controller 1204. When operating in the routing mode, distribution flip-flop 1105 is disabled via controller 1204.

Consider the operation of input control 1101 performing a distribution function within switch node 200-7. Input circuit 1210 receives packets from trunk controller 104 via cable 131 and transmits to trunk controller 104 the link open signal via cable 131 under control of controller 1204. The function of the link open signal is described later with respect to output control 1103 in FIG. 14. The incoming packets are shifted into input shift register 1200. Input shift register 1200 is used to detect the start bit, which indicates the beginning of a packet. From input shift register 1200, packets are shifted into buffer shift register 1203, which is capable of buffering one complete packet. Buffer shift register 1203 provides an output after each 64 bits of storage. These outputs can be selected by data selector 1205 under control of controller 1204 to bypass unused portions of buffer shift register 1203. This bypassing is done when it is not necessary to buffer a whole packet before transmission of the packet can start to the output circuit and is done to speed up the transfer of a packet through input circuit 1100. Multiplexer 1207 under control of controller 1204 selects which of the cables, 1110 or 1111 the data is to be transmitted on. Input control 1101 distributes the packets to either switch node 201-3, via output control 1102 and link 207, or to switch node 201-7 via output control 1103 and link 213. Input control 1101 alternately distributes packets between the two switch nodes, providing the selected switch node is ready to accept a packet.

Incoming packets are received from trunk controller 104 on conductor 131 and are shifted into register 1200 at the system clock rate provided on conductor 1211. When the start bit reaches bit position 9, indicating that the beginning of the packet has been completely shifted into register 1200, controller 1204 is notified of this via a signal on conductor 1212. Upon receipt of this signal, input control 1102 sends a request signal to either output control 1101 or 1103, depending on the state of distribution flip-flop 1105 on conductor 1232. If the output of flip-flop 1105 is a "0", this indicates that output control 1103 had received the previous packet, and controller 1104 sends the request signal to output control 1102. If the output of flip-flop 1105 is a "1", this indicates that output control 102 had received the last packet, and controller 1104 sends the request signal to output control 1103. At the same time, the incoming packet is shifted through input shift register 1200 into buffer shift register 1203. Assuming that flip-flop 1105 is at state "0", input control 1101 sends a request signal to output control 1102 via cable 1110. As soon as output control 1102 is ready to receive the packet, it sends a grant signal to input control 1101 on cable 1110. Upon receipt of this grant signal, controller 1204 causes data selector 1205 to forward the packet, which is being shifted into register 1203, to output control 1102 via the disabled address rotation circuit 1206, multiplexer 1207, and cable 1110. Data selector 1205 allows the packet to be forwarded to the output control immediately upon the receipt of a grant signal. In this way, an entire packet need not be buffered by register 1203; this allows for faster transmission of the packet. The presence of the grant signal also causes controller 1204 to change the state of flip-flop 1105 via conductor 1231; this causes controller 1204 to send a request signal to output control 1103 upon the receipt of the next packet.

If output control 1102 does not respond to the request signal within a specified period of time, control 1204 removes the request signal toward output control 1102 and forwards a request signal to output control 1103. If output control 1103 does not respond to the request signal after a specified portion of time, control 1204 alternates request signals between the two output controls until one of them responds with a grant signal. While this is happening, the incoming packet is buffered by buffer shift register 1200. The specified period of time is determined by counting clock pulses which are received from system clock 134 via conductor 1211.

Consider the operation of input control 1101 performing its function within routing node 201-7. For purpose of this description, cable and conductor numbers are shown in parenthesis. Input control 1101 is configured to perform the routing function via a disable signal which is strapped from the backplane via conductor 1112. When operating in the routing mode, distribution flip-flop 1105 is disbled via controller 1204.

Input circuit 1210 receives the incoming packets from node 200-7 and transmits to node 200-7 the link open signal via conductor 213 under control of controller 1204. The function of the link open signal will be explained in a later section describing output control 1203. Input shift register 1200 is used to detect the start bit, as previously described. In addition, input shift register 1200 is used to extract the network packet length field, which is saved in length register 1202, and to extract the most significant bit of the network address field, which is saved in address register 1201. The buffer shift register 1103 is capable of buffering one complete packet, as previously described. Address rotation circuit 1106 performs the previously mentioned left rotate operation on the network address field before this address is transmitted with the remainder of the packet to the selected output control. Multiplexer 1107 under control of controller 1104 selects which of the cables 1110 or 1111 the data is to be transmitted on, based on the address field of the incoming packet The operation of input control 1101 will now be further explained by using the previous example which dealt with the transmission of the packet shown in FIG. 5. Input shift register 1200 is continuously being clocked by system clock 161 via conductor 1211. As data is received via input conductor 213 it is clocked through input shift register 1200. Once the start bit reaches bit position 9 of input shift register 1200, controller 1204 detects this bit and transmits a pulse on conductor 1213. This pulse causes length register 1202 to store the network packet length field, and causes address register 1201 to store the most significant bit of the network address field, which is contained in bit position 0 of input shift register 1200.

Controller 1204 transmits a request via conductor 1110 to output control 1102 since the most significant address bit indicates that the packet is to be transmitted to this output control. While this request is being made, data is being shifted from input shift register 1200 to buffer shift register 1203 which has a number of output terminals. These output terminals are connected to different bit positions within buffer shift register 1203. When controller 1204 receives a grant signal from output control 1102 via conductor 1110, controller 1204 calculates at which output of buffer shift register 1203 the start bit of the packet is approaching within buffer shift register 1203. This is done so that transmission of the packet to output control 1102 can start as soon as possible. On the basis of this calculation, controller 1204 controls data selector 1205 to select the designated output of buffer shift register 1203. The control information is transmitted to data selector 1205 via cable 1217. Data selector 1205 transmits the data from the selected output to address rotation circuit 1206 via conductor 1216. Before transmitting data, controller 1204 resets address rotation circuit 1206 by transmitting the start of packet signal via conductor 1219. Controller 1204 then uses the packet length information stored in length register 1202, which it reads via cable 1220, to determine when the end of the packet has entered the input shift register. When this occurs and transmission has started from shift register 1203, controller 1204 transmits the link open signal via conductor 1215. This signal is retransmitted via tri-state driver 1209 and input conductor 131 to input port 503-60. The link open signal indicates that input control 1000 is now ready to receive another packet. This function is explained in the section dealing with the output control circuit.

Figure 13:
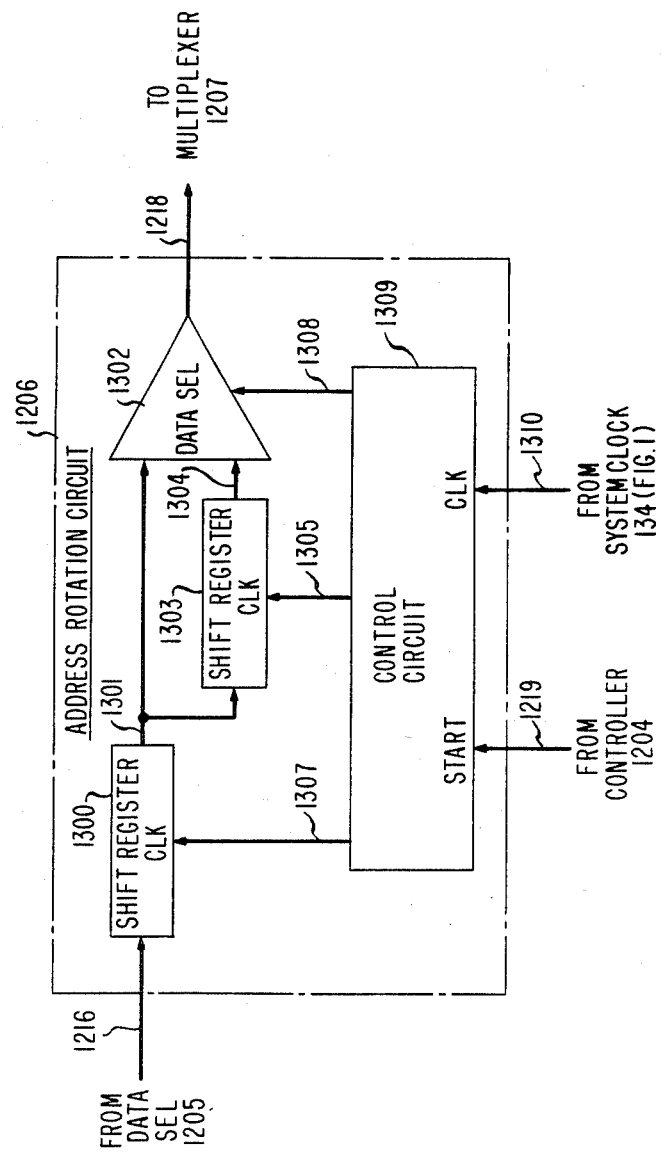
FIG. 13 is a detailed block diagram of address rotation circuit 1206.

Address rotation circuit 1206 is illustrated in greater detail in FIG. 13. The purpose of circuit 1206 is to rotate the address field to the left one bit so that the most significant bit becomes the least significant bit. The rotation is necessary because each input control decodes only the most significant bit. Shift registers 1300 and 1303 are one bit shift registers, data selector 1302 is used to select either the output of shift register 1300 or shift register 1303, and control circuit 1309 controls the operation of the address rotation circuit. When control circuit 1309 receives the start of packet signal from controller 1204 via conductor 1219, it transmits a clock signal to shift register 1300 via conductor 1307, and to shift register 1303 via conductor 1305. This clock signal is derived from the signal received from system clock 161 via conductor 1310. Control circuit 1309 conditions data selector 1302 via conductor 1308 to select shift register 1303's output to be transmitted on conductor 1218. Control circuit 1309 then counts the number of bits that are being transmitted via conductor 1218; when the most significant bit of the network address field is contained within shift register 1303, control circuit 1309 ceases to transmit the clock signal to shift register 1303 via conductor 1305, and conditions data selector 1302 to select the output of shift register 1300. Control circuit 1309 then waits until the remaining bits of the network address field have been transmitted via conductor 1118. At this point in time, control circuit 1309 commences to send clock signals to shift register 1303, and conditions data selector 1302 to select the output of shift register 1303. This operation results in the most significant bit of the network address field being rotated.

Figure 14:
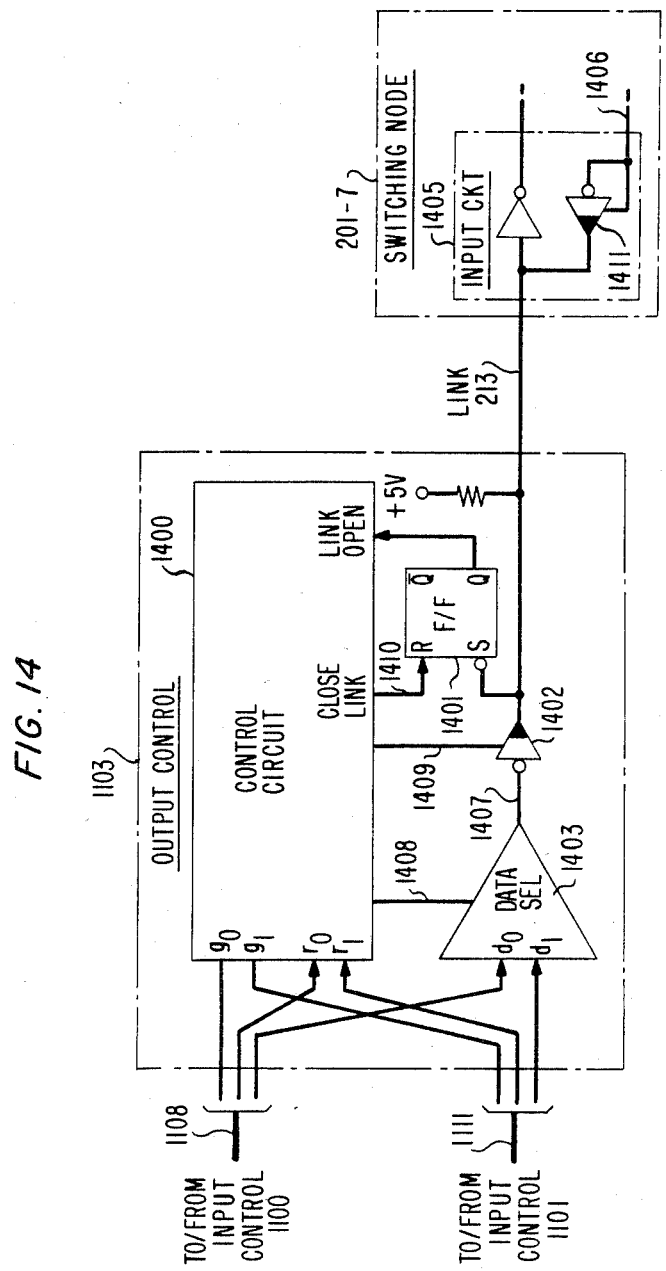
FIG. 14 is a detailed block diagram of output control 1102 of switch node 200-7.

Output control 1103 is shown in greater detail in FIG. 14. Control circuit 1400 responds to requests from input controls 1100 and 1101, which are transmitted via cables 1108 and 11112. If flip-flop 1401 is set, control circuit 1400 responds to the request by transmitting a grant signal back to the requesting input control via one of the above mentioned cables. After acknowledging the request, control circuit 1400 conditions data selector 1403 to select the data conductor from the appropriate cable 1108 or 1111. Control circuit 1400 transmits the appropriate control information to data selector 1403 via cable 1408. Data selector 1403 transfers the data information received on the selected input terminal to conductor 1407. Tri-state device 1402 takes the information on conductor 1407 and transmits this data via link 213 to input circuit 1405, which is part of switch node 201-7. Control circuit 1400 controls the output of tri-state device 1402 via conductor 1409.

The operation of output control 1103 as shown in FIG. 14 will be explained in greater detail by considering the example of input control 1101 transmitting a packet of data to output control 1103 via cable 1111. When input control 1101 transmits the request signal via conductor 1111, control circuit 1400 transmits the grant signal to input control 1101 via conductor 1111 if the link is not being used by one of the other input control circuits and the output of flip-flop 1401 is set. Assuming that flip-flop 1401 is set, control circuit 1400 transmits the grant signal to input control 1001 and conditions data selector 1403 via cable 1408 to select the data being transmitted on conductor 1111 and retransmit this data on conductor 1407. In addition, control circuit 1400 enables the tri-state device 1402 to transfer the information on conductor 1407 to link 213.

After input control 1101 has transmitted the entire packet, it removes the request signal from conductor 1111. Once the request signal is removed from conductor 1111, control circuit 1400 sends a request signal to flip-flop 1401 via conductor 1409. Once the input control of the switch node 201-7 is capable of accepting another packet, it transmits the open link signal via conductor 1406, tri-state device 1411, and link 213. The open link signal sets flip-flop 1401 via the S input. Once flip-flop 1401 is set, control circuit 1400 can once again respond to request signals from the input controls.

It is to be understood that the above-described embodiment is merely illustrative of the principles of this invention; other arrangements may be devised by those skilled in the art without departing from the spirit and scope of the invention.

What is claimed is:

1. A switching network for communicating packets each comprising address routing information from network input ports to network output ports, said network comprising a plurality of distribution stages and a plurality of routing stages each of said distribution stages comprises a plurality of switch nodes each responsive to the receipt of one of said packets independent of said addressing routing information for alternating communicating said one of said packets to one of a subset of said nodes of a subsequent one of said stages; and each of said routing stages comprises switch nodes each responsive to another receipt of said one of said packets and the address routing information of said one of said packets for communicating said one of said packets to another subsequent one of said stages.

2. The switching network of claim 1 wherein each of said switch nodes in said distribution stages comprises means for storing signals alternately designating the one of said subset of switch nodes of said subsequent one of said stages; and means responsive to the receipt of another one of said packets and said stored signals for alternately selecting another one of said subset of said switch nodes of said subsequent one of said stages for the communication of said other one of said packets.

3. The switching network of claim 1 wherein each of said switch nodes of said routing and distribution stages comprises means responsive to a first signal for communicating said one of said packets in response to said address information; and means responsive to a second signal for alternatingly communicating said one of said packets.

4. The switching network of claim 3 wherein said address routing information of said one of said packets comprises a plurality of address bit signals and each of said switch nodes of said routing stages being further responsive to said first signal for repositioning a predetermined number of address bit signals in said plurality of address bit signals in said one of said packets before communication of said one of said packets to said other subsequent one of said stages.

5. The invention of claim 4 wherein said predetermined number of said address bit signals comprise the most significant address bit signals in said plurality of address bit signals; and said repositioning means reallocates said most significant bit signals to a lesser significant bit signal position in said plurality of address bit signals and lesser significant bit signals in said plurality of address bit signals to the most significant bit signal position.

6. An alternate-path, self-routing, packet, switching system for switching packets for a plurality of messages from a plurality of digital transmission links comprising:

a packet switching network having a plurality of interconnected packet switch nodes;

a plurality of distributed controllers each for interfacingly connecting an individual one of said transmission links to one of said packet switch nodes;

each of said packets comprising a plurality of address bit signals;

each of said switch nodes comprising a plurality of input conductors and a plurality of output conductors;

a first one of said switch nodes further comprising means responsive to a packet communication available signal from a second one of said switch nodes and a distribution signal for alternatingly communicating a received packet of said one of said messages from one of said input conductors of said first switch node to one of said output conductors of said first switch node;

said one of said output conductors of said first switch node connected to one of said input conductors of said second one of said switch nodes;

said second one of said switch nodes comprises buffer means for storing bit signals of said packets;

means responsive to said buffer means of said second node having present capacity to receive one of said packets for transmitting said packet communications available signal; and means responsive to a predetermined number of said address bit signals of said received packet designating a third one of said switch nodes and another packet communication available signal from said third switch node and a routing signal for routing said received packet of said one of said messages to said third switch node.

7. The switching network of claim 6 wherein said first one of said switch nodes comprises means for storing signals alternately designating a fourth one of said switch nodes upon the routing of said received packet of said one of said messages to said third switch node; and means responsive to the receipt of another packet of said one of said messages and said stored signals for alternately routing said other received packet of said one of said message to said fourth switch node.

8. The switching network of claim 6 wherein said routing means of said first switch node further responsive to the absence of said packet communication available signal from said second switch node for routing said packet to a fourth one of said switch nodes upon receipt of a packet communication available signal from said fourth switch node.

9. The switching network of claim 7 wherein said storing means of said first switch node comprises a flip-flop and means responsive to said routing of said received packet for toggling said flip-flop to designate said fourth switch node.

10. An alternate-path, self-routing, packet switching network for communicating a plurality of packets comprising:

a plurality of n distribution stages and a plurality of m routing stages where m is greater than n;

each of said stages having a plurality of input and output terminals;

the first 2 times n stages of said network comprises alternate ones of said distribution and routing stages;

the remaining m minus (2 times n) stages of said network comprising other ones of said routing stages;

each of said packets comprising address information;

each of said distribution stages responsive to receipt of a received one of said packets for alternately communicating said received one of said packets to one of a subset of said input terminals of a subsequent one of said routing stages; and each of said routing stages responsive to another receipt of said received one of said packets and said address information for communicating said received one of said packets to one of said input terminals of a subsequent one of said stages.

11. The switching network of claim 10 wherein each of said distribution stages comprises a plurality of switch nodes each responsive to the receipt of said received one of said packets for alternating communicating said received one of said packets to said one of said subset of said input terminals of said subsequent one of said routing stages.

12. The switching network of claim 11 wherein each of said switch nodes in said distribution stages comprises means for storing signals alternately designating said one of said subset of said input terminals of a subsequent one of said routing stages; and means responsive to the receipt of another received one of said packets and said stored signals for alternately selecting another one of said subset of said input terminals of said subsequent one of said routing stages for the communication of said other received one of said packets.

13. The switching network of claim 11 wherein each of said routing stages comprises switch nodes each responsive to said other receipt of said received one of said packets and said address information of said one of said packets for communicating said received one of said packets to said one of said input terminals of said subsequent one of said stages.

14. The switching network of claim 13 wherein each of said switch nodes of said routing and distribution stages comprises means responsive to a first signal for communicating said received one of said packets in response to said address information; and means responsive to a second signal for alternatingly communicating said received one of said packets.

15. The switching network of claim 14 wherein said address routing information of said received one of said packets comprises a plurality of address bit signals and each of said switch nodes of said routing stages being further responsive to said first signal for repositioning a predetermined number of address bit signals in said plurality of address bit signals in said received one of said packets before communication of said received one of said packets to said subsequent one of said stages.

16. The invention of claim 15 wherein said predetermined number of said address bit signals comprise the most significant address bit signals in said plurality of address bit signals; and said repositioning means reallocates said most significant bit signals to a lesser significant bit signal position in said plurality of address bit signals and lesser significant bit signals in said plurality of address bit signals to the most significant bit signal position.

* * * * *